US012807782B2

(12) United States Patent
Stoychev et al.

(10) Patent No.: US 12,807,782 B2
(45) Date of Patent: Nov. 24, 2026

(54) PROCESS OF PRODUCING A POLYOL COMPOSITION CONTAINING POLYOLS RELEASED FROM WASTE POLYURETHANE

(71) Applicant: H&S Anlagentechnik GmbH, Sulingen (DE)

(72) Inventors: Valentin Stoychev, Wildau (DE); Tsvetomir Tsonev, Wildau (DE)

(73) Assignee: H&S Anlagentechnik GmbH, Sulingen (DE)

( * ) Notice: Subject to any disclaimer, the term of this patent is extended or adjusted under 35 U.S.C. 154(b) by 839 days.

(21) Appl. No.: 18/030,987

(22) PCT Filed: Oct. 8, 2021

(86) PCT No.: PCT/EP2021/077837

§ 371 (c)(1),
(2) Date: Apr. 7, 2023

(87) PCT Pub. No.: WO2022/074184

PCT Pub. Date: Apr. 14, 2022

(65) Prior Publication Data

US 2023/0399486 A1 Dec. 14, 2023

(30) Foreign Application Priority Data

Oct. 8, 2020 (DE) ..................... 10 2020 126 425.9

(51) Int. Cl.
*C08J 11/26* (2006.01)

(52) U.S. Cl.
CPC ............ *C08J 11/26* (2013.01); *C08J 2375/04* (2013.01)

(58) Field of Classification Search
USPC ........................................................ 521/40.5
See application file for complete search history.

(56) References Cited

FOREIGN PATENT DOCUMENTS

| | | | |
|---|---|---|---|
| CN | 102585286 | A | 7/2012 |
| CN | 107286369 | A | 10/2017 |
| DE | 19512778 | C1 | 12/1996 |
| DE | 102013106364 | A1 | 12/2014 |
| DE | 102016122276 | A1 | 5/2018 |
| EP | 4200348 | A1 | 6/2023 |
| EP | 4200349 | A1 | 6/2023 |
| WO | 2018091575 | A1 | 5/2018 |
| WO | WO-2018091568 | A1 * | 5/2018 .............. C08J 11/26 |

OTHER PUBLICATIONS

WO-2018091568-A1 Machine Translation (Year: 2018).*
Aleksandra Kemona * and Małgorzata Piotrowska et al., Polyurethane Recycling and Disposal: Methods and Prospects. Received: Jul. 13, 2020; Accepted: Aug. 4, 2020; Published: Aug. 5, 2020 (Year: 2020).*
International Preliminary Report on Patentability dated Mar. 28, 2022, for corresponding International Application No. PCT/EP2021/077837 filed Oct. 8, 2021; total 6 pages .
Gama N. et al., Chemical Engineering Journal 395, 2020, 125102.
Gadhave R. et al., Open J. Polym. Chem., 2019, 9, 39-51.
Https://active-oxygens.evonik.com/en/products-and-services/hydrogen-peroxide/general-information.
Https://active-oxygens-sustainability.evonik.com/en/articles/what-is-hydrogen-peroxide/.
Https://echa.europa.eu/es/registration-dossier/-/registered-dossier/15701/2/1.
Arcol® Polyol 1104 specification sheet.
Third Party Observation for corresponding European Application No. 21789728 filed Oct. 8, 2021; total 11 pages.
Third Party Observation for corresponding European Application No. 21789728 filed Oct. 8, 2021; total 2 pages.
Third Party Observation for corresponding European Application No. EP20210789728 filed Oct. 8, 2021; total 2 pages.
Third Party Observation for corresponding European Application No. EP20210789728 filed Oct. 8, 2021; total 18 pages.
International Search Report dated Mar. 18, 2022, for corresponding International Application No. PCT/EP2021/077837 filed Oct. 8, 2021; total 5 pages.
Written Opinion of the International Searching Authority Mar. 18, 2022, for corresponding International Application No. PCT/EP2021/077837 filed Oct. 8, 2021; total 9 pages.
Examination Report dated May 14, 2021, in corresponding German Application No. 102020126425.9 filed Oct. 8, 2020; total 6 pages.

* cited by examiner

*Primary Examiner* — Terressa Boykin
(74) *Attorney, Agent, or Firm* — Verrill Dana, LLP

(57) ABSTRACT

The invention relates to a process for producing a polyol composition containing polyols released from polyurethane waste, and also to a polyol composition produced using this process, and to the use thereof.

19 Claims, No Drawings

PROCESS OF PRODUCING A POLYOL COMPOSITION CONTAINING POLYOLS RELEASED FROM WASTE POLYURETHANE

CROSS-REFERENCE TO RELATED APPLICATIONS

The present application is a U.S. National Stage entry under 35 U.S.C. § 371 of International Application No. PCT/EP2021/077837 filed Oct. 8, 2021, which claims priority to, and the benefit of German Application No. 102020126425.9 filed Oct. 8, 2020, which applications are hereby incorporated by reference in their entirety.

FIELD

The present invention relates to a process for producing a polyol composition containing polyols released from polyurethane waste, and also to a polyol composition produced using this process, and to the use thereof.

BACKGROUND

DE 195 12 778 C1 proposes a process for producing isocyanate-reactive polyol dispersions in which polyurethane waste is subjected to a decomposition reaction with cyclic dicarboxylic anhydrides and/or dicarboxylic acids that form cyclic dicarboxylic anhydrides and/or the derivatives thereof in the presence of polyether-ols having a molar mass of approximately 500 to 5000 g/mol and a hydroxyl functionality of 2 to 5 at a temperature of approximately 140 to 250° C., wherein the polyether-ols are subjected to a radical grafting reaction with carbon-unsaturated, carbonyl group-containing monomers before, during or after the decomposition reaction. The grafting reaction is typically carried out in the presence of radical formers, with e.g., peroxides being used as radical formers.

WO 2018/091568 A1 describes a process for producing polyol dispersions from post-consumer polyurethane waste in the presence of polyether-ols, wherein, in a first reaction step a), the polyurethane waste is first reacted with a reaction mixture containing at least one dicarboxylic acid or a dicarboxylic acid derivative and at least one polyether-ol having an average molar mass of 400 to 6000 g/mol and a hydroxyl functionality of 2 to 4 at temperatures of 170° C. to 210° C., forming a dispersion, and, in a second reaction step b), the dispersion obtained in a) is reacted again with at least one short-chain diol and/or a short-chain triol at temperatures of 180° C. to 230° C., giving a polyol dispersion. In order to initiate or accelerate the chemical reaction of polyurethane groups with said dicarboxylic acids or derivatives thereof (e.g., dicarboxylic anhydrides), i.e., in order to activate the reaction mixture, a radical former suitable for initiating a radical polymerization is preferably added. Use is preferably given to peroxide compounds as suitable radical formers, e.g., an inorganic peroxide, preferably hydrogen peroxide, and/or an organic peroxide, preferably tert-butyl hydroperoxide, tert-amyl hydroperoxide, 1,1,3,3-tetramethylbutyl hydroperoxide and/or cumoyl hydroperoxide.

However, the use of radical formers (radical initiators), e.g., peroxides, is associated with certain disadvantages. Radical formers, e.g., peroxides, are hazardous substances that can cause explosions. Therefore, plants for the processes described in DE 195 12 778 C1 or WO 2018/091568 A1 must be designed to be explosion-proof.

The processes described in DE 195 12 778 C1 and WO 2018/091568 A1 take place in the presence of at least one polyether-ol (polyether polyol). One or more antioxidants are usually added to commercially available polyether polyols. Antioxidants are also typically present in the polyurethane waste itself. Antioxidants react with radical formers, e.g., peroxides, forming products that cause a dark coloration (brown, in some cases even very dark brown) of the polyol dispersions produced. This conflicts with the use of the polyol dispersion for producing polyurethane materials for high-quality applications.

In some cases, the reaction of antioxidants with radical formers, e.g., peroxides, can proceed very intensely, e.g., with a great deal of foam formation. As a result, it is difficult to control the process, and careful monitoring of the process flow is necessary. In addition, certain polyether polyols (e.g., some polyether polyols that were prepared using the KOH process, and some polyether polyols having predominantly primary OH groups) have a tendency to form clumps (i.e., very large agglomerations), deposits on plant parts, and exhibit large losses in quality, in the presence of radical formers due to unwanted side-reactions.

A further disadvantage of the abovementioned processes from the prior art is that they are unsuitable for recovering polyester polyols from polyurethane waste, or that the quality of the polyester polyols released is very low.

The object of the present invention is to provide a process for producing a polyol composition containing polyols released from polyurethane waste, which method overcomes the stated disadvantages of the prior art.

SUMMARY

Processes for producing a polyol composition containing polyols released from polyurethane waste are disclosed herein. In an example, the process involves a reaction mixture wherein:

(a) polyurethane waste is reacted with;

(b) one or more compounds selected from the group consisting of;

polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4, (c) one or more compounds selected from the group consisting of dicarboxylic anhydrides and dicarboxylic acids; and (d) water, forming a polyol composition containing polyols released from the polyurethane waste.

In an example, the compounds (b) from the group of the polyether polyols have an average molar mass in the range from 200 g/mol to 6000 g/mol, preferably 400 g/mol to 5000 g/mol, and the compounds (b) from the group of the polyester polyols have an average molar mass in the range from 350 g/mol to 6000 g/mol, preferably 400 g/mol to 5000 g/mol.

In an example, the compounds (c) from the group consisting of dicarboxylic anhydrides and dicarboxylic acids are selected from the group consisting of adipic acid and the anhydrides of maleic acid, phthalic acid, hexahydrophthalic acid and succinic acid, and/or the reaction mixture includes, in addition to one or more compounds (c) from the group consisting of dicarboxylic anhydrides and dicarboxylic acids, one or more monocarboxylic acids.

In an example, the water (d) is initially charged and heated to a temperature of 130° C. to 230° C., preferably 140° C. to 200° C. The polyurethane waste (a) is metered into this mixture such that the reaction mixture is formed, wherein the temperature is kept in the range from 130° C. to 230° C., preferably 140° C. to 210° C. In parallel with the metering-in of the polyurethane waste (a), further water (d) is added in one or more portions, or continuously. The reaction mixture is kept at a temperature in the range from 150° C. to 240° C., preferably 200° C. to 230° C., for 1 to 5 hours, preferably 2 to 3.5 hours. A further portion of the one or more compounds (c) from the group consisting of dicarboxylic anhydrides and dicarboxylic acids is added. Following the addition of the further portion of the one or more compounds (c), the reaction mixture is kept at a temperature in the range from 170° C. to 240° C., preferably 180° C. to 230° C., for 0.5 to 3 hours, preferably 0.5 to 1.5 hours, and thereafter, the reaction mixture is cooled.

In an example, one or more compounds (e) selected from the group consisting of diols having 2 to 8 carbon atoms and triols having 3 to 8 carbon atoms are added to the reaction mixture. In an example, the compounds (e) from the group consisting of diols having 2 to 8 carbon atoms and triols having 3 to 8 carbon atoms are selected from the group consisting of ethylene glycol, diethylene glycol, dipropylene glycol, 1,3-propaneglycol, 1,2-butanediol, 1,4-butaneglycol and glycerol.

In an example process, the mixture comprising the one or more compounds (b), the one or more compounds (c) selected from the group consisting of dicarboxylic anhydrides and dicarboxylic acids, and optionally one or more monocarboxylic acids, and the water (d) is initially charged and heated to a temperature of 130° C. to 230° C., preferably 140° C. to 200° C. The polyurethane waste (a) is metered into this mixture such that the reaction mixture is formed, wherein the temperature is kept in the range from 130° C. to 230° C., preferably 140° C. to 210° C. In parallel with the metering-in of the polyurethane waste (a), further water (d) is added in one or more portions, or continuously. One or more compounds (e) selected from the group consisting of diols having 2 to 8 carbon atoms and triols having 3 to 8 carbon atoms are added if the polyurethane waste (a) has been metered in at least to a third, preferably to a half, and has dissolved, or one or more compounds (e) from the group consisting of diols having 2 to 8 carbon atoms and triols having 3 to 8 carbon atoms are added if the polyurethane waste (a) has completely dissolved. The reaction mixture is kept at a temperature in the range from 150° C. to 240° C., preferably 200° C. to 230° C., for 1 to 5 hours, preferably 2 to 3.5 hours. A further portion of the one or more compounds (c) selected from the group consisting of dicarboxylic anhydrides and dicarboxylic acids is added. Following the addition of the further portion of the one or more compounds (c), the reaction mixture is cooled or is kept at a temperature in the range from 150° C. to 240° C., —preferably 200° C. to 230° C., for 0.25 to 1.5 hours, preferably 0.5 to 1 hours, and is cooled thereafter.

In an example process, the mixture comprising the one or more compounds (b), the one or more compounds selected from the group consisting of dicarboxylic anhydrides and dicarboxylic acids, and optionally one or more monocarboxylic acids, and the water (d) is initially charged and heated to a temperature of 130° C. to 230° C., preferably 140° C. to 200° C. The polyurethane waste (a) is metered into this mixture such that the reaction mixture is formed, wherein the temperature is kept in the range from 130° C. to 230° C., preferably 140° C. to 210° C. In parallel with the metering-in of the polyurethane waste (a), further water (d) is added in one or more portions, or continuously. The reaction mixture is kept at a temperature in the range from 150° C. to 240° C., preferably 200° C. to 230° C., for 1 to 5 hours, preferably 2 to 3.5 hours. A further portion of the one or more compounds (c) from the group consisting of dicarboxylic anhydrides and dicarboxylic acids is added. Following the addition of the further portion of the one or more compounds (c), the reaction mixture is kept at a temperature in the range from 170° C. to 240° C., preferably 180° C. to 230° C., for 0.25 to 1.5 hours, preferably 0.5 to 1 hour. One or more compounds (e) selected from the group consisting of diols having 2 to 8 carbon atoms and triols having 3 to 8 carbon atoms are added. Following the addition of the one or more compounds (e), the reaction mixture is kept at a temperature in the range from 170° C. to 240° C., preferably 180° C. to 230° C., for 0.25 to 1.5 hours, preferably 0.5 to 1 hours, and thereafter, the reaction mixture is cooled.

In an example process, the mixture comprising the one or more compounds (b), the one or more compounds (c) selected from the group consisting of dicarboxylic anhydrides and dicarboxylic acids, and optionally one or more monocarboxylic acids, and the water (d) is initially charged and heated to a temperature of 130° C. to 230° C., preferably 140° C. to 200° C. The polyurethane waste (a) is metered into this mixture such that the reaction mixture is formed, wherein the temperature is kept in the range from 130° C. to 230° C., preferably 140° C. to 210° C. In parallel with the metering-in of the polyurethane waste (a), further water (d) is added in one or more portions, or continuously. One or more compounds (e) selected from the group consisting of diols having 2 to 8 carbon atoms and triols having 3 to 8 carbon atoms are added if the polyurethane waste (a) has been metered in at least to a third, preferably to a half, and has dissolved, or the one or more compounds (e) selected from the group consisting of diols having 2 to 8 carbon atoms and triols having 3 to 8 carbon atoms are added if the polyurethane waste (a) has completely dissolved. The reaction mixture is kept at a temperature in the range from 150° C. to 240° C., preferably 200° C. to 230° C., for 1 to 5 hours, preferably 2 to 3.5 hours. A further portion of the one or more compounds (c) selected from the group consisting of dicarboxylic anhydrides and dicarboxylic acids is added. Following the addition of the further portion of the one or more compounds (c), the reaction mixture is kept at a temperature in the range from 170° C. to 240° C., preferably 180° C. to 230° C., for 0.25 to 1.5 hours, preferably 0.5 to 1 hours. A further portion of the one or more compounds (e) selected from the group consisting of diols having 2 to 8 carbon atoms and triols having 3 to 8 carbon atoms is added. Following the addition of the further portion of the one or more compounds (e), the reaction mixture is kept at a temperature in the range from 170° C. to 240° C., preferably 180° C. to 230° C., for 0.25 to 1.5 hours, preferably 0.5 to 1 hour, and thereafter, the reaction mixture is cooled.

In an example process, upon cooling the reaction mixture, a further portion of the compounds (b) may be added.

In an example process, the polyurethane waste (a) is added in a total amount of 30 wt % to 60 wt %, and/or the compounds (b) selected from the group consisting of polyether polyols and polyester polyols and acrylic acid are added in a total amount of 20 wt % to 60 wt %, and/or the compounds (c) selected from the group consisting of dicarboxylic anhydrides and dicarboxylic acids and monocarboxylic acids are added in a total amount of 5 wt % to 20 wt %, and/or the water (d) is added in an amount of 0.2 wt % to 10 wt %, preferably 1 wt % to 6 wt %, particularly preferably 2 wt % to 5 wt %, and/or optional compounds (e) selected from the group consisting of diols having 2 to 8 carbon atoms and triols having 3 to 8 carbon atoms are added in a total amount of 1 wt % to 30 wt %, in each case relative to the total mass of the reactants (a), (b), (c), (d) and (e) as 100 wt %.

DETAILED DESCRIPTION

According to the invention, this object is achieved by a process for producing a polyol composition containing polyols released from polyurethane waste, wherein, in a reaction mixture, (a) polyurethane waste is reacted with (b) one or more compounds from the group consisting of polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4, (c) one or more compounds from the group consisting of dicarboxylic anhydrides and dicarboxylic acids, and (d) water, forming a polyol composition containing polyols released from the polyurethane waste.

Surprisingly, it was found that the release of polyols from polyurethane can be initiated by adding water, without adding a radical former, e.g., a peroxide compound.

Use is preferably made of demineralized, distilled or deionized water.

Water is preferably added in an amount of 0.2 wt % to 10 wt %, preferably 1 wt % to 6 wt %, in some cases particularly preferably 2 wt % to 5 wt %, relative to the total mass of the reactants (a), (b), (c), (d) and optionally (e) (see below) as 100 wt %. Water which may already be present in the polyurethane waste is not included in this calculation. The polyurethane waste should preferably not be soaked through.

If the reaction mixture contains more water than required for the reaction, the excess water can be distilled off.

In certain cases, in particular in the case of waste predominantly containing flexible polyurethane foam, it is preferred that the water content of the reaction mixture is 1.5 wt % to 10 wt % relative to the total mass of the reactants (a), (b), (c), (d) and optionally (e), with the water already contained in the polyurethane waste (e.g., water absorbed by the waste from the ambient humidity or air humidity) being included in the calculation. Pre-drying of the polyurethane waste is thus advantageously unnecessary.

The total amount of water (d) to be used can be metered in in portions, e.g., preferably, a first portion of water (d) is preferably initially charged together with the above-defined compounds (b) from the group consisting of polyether polyols and polyester polyols and compounds (c) from the group consisting of dicarboxylic anhydrides and dicarboxylic acids, and further water (d) is added in parallel with the metering-in of the polyurethane waste (a), in one or more portions or continuously.

It is preferred that, in the process according to the invention, peroxides are used in an amount of less than 0.1 wt % relative to the total mass of the reactants (a), (b), (c), (d) and optionally (e) (see below) as 100 wt %, preferably 0.05 wt % or less, particularly preferably 0.01 wt % of peroxides or less, in each case relative to the total mass of the reactants (a), (b), (c), (d) and optionally (e) (see below) as 100 wt %. Particularly preferably, no peroxides are used; more particularly preferably, absolutely no radical formers are used. Thus, preferably no peroxides are added in the process according to the invention, and the polyol composition produced using the process according to the invention does not contain any reaction products formed by reactions of, or with, peroxides. More preferably, no radical formers are added in the process according to the invention, and the polyol composition formed does not contain any reaction products formed by reactions of, or with, radical formers.

Polyurethane waste which can be processed by means of the process according to the invention includes both post-production waste and post-consumer waste, e.g., in the form of scrap furniture, pillows, cushions, mattresses, car seats and shoe soles. The polyurethane waste may for example contain fillers and/or additives. The polyurethane waste may for example be solid or foamed. There are no restrictions in the process according to the invention in terms of the type and composition of the polyurethane waste. It is not necessary to provide polyurethane waste of a single type, and it is therefore advantageously possible to dispense with an expensive step of pre-sorting the polyurethane waste.

For technical reasons, it is commonly preferred to separate extraneous matter such as textiles, steel, wood and other extraneous substances from the polyurethane waste.

The process according to the invention is also suitable for polyurethane waste in which polyurethane is associated with thermoplastics such as polyolefins, ABS or PVC and can only be separated therefrom with difficulty. Such thermoplastics are dispersed in the polyol composition according to the invention, and can be removed from the polyol composition by means of liquid-solid separation, e.g., by filtration.

The polyurethane waste is preferably used in comminuted form. The degree of comminution can be freely selected and only influences the rate of conversion of the polyurethane waste.

The process according to the invention is for example suitable for processing polyurethane foam waste, in particular for processing flexible polyurethane foam, cellular and microcellular polyurethane materials, polyurethane elastomers, PUR integral rigid foam, semi-rigid polyurethanes, thermoplastic polyurethanes (TPU), rigid polyurethane foams and rigid PUR/PIR foams. The polyurethane waste can be processed in sorted or un-sorted form by means of the process according to the invention. The polyurethane waste can originate from production and also from the post-consumer sector.

The process according to the invention is for example suitable for processing polyurethane foam waste (rigid, semi-rigid and flexible foam), particularly for processing semi-rigid and flexible foam).

For the avoidance of doubt, flexible polyurethane (PU) foams have an open cellular structure or a partially open cellular structure. They are produced by means of a wide variety of technologies and processes, for example the continuous block process or discontinuous box process, as well as being freely foamed or foamed to shape, and are known by those skilled in the art under the following names: PU block foam, cold foam, standard flexible polyurethane foam, HRPU foam (High Resilience Polyurethane Foam), viscoelastic polyurethane foam (memory PU foam), molded PU foam, flexible POP foams, SAN (styrene acrylonitrile)-filled flexible foams, etc. Said flexible polyurethane foams are produced in a wide variety of densities (typically from 10 $kg/m^3$, e.g., packing foam, to more than 200 $kg/m^3$, e.g., for technical applications) and are predominantly used in the manufacture of mattresses, in the furniture industry, for automotive applications, and also e.g., as technical flexible PU foams and PU packaging.

Flexible polyurethane foams can have an open cellular structure, a hardness of 300 N to 500 N at 40% loading, measured according to SS-EN ISO 2439:2008(E) and also a resilience of 25 to 60% (measured according to EN ISO 8307).

Cellular and microcellular polyurethane elastomers have an open-celled or close-celled structure. Integral rigid foams, in a variation on cellular and microcellular polyurethane elastomers, have a porous core and a virtually solid marginal region, and are produced in a mold by reaction injection molding (RIM). Cellular and microcellular polyurethane elastomers can be produced as flexible, semi-flexible and rigid products. Mention may be made, as typical applications, for example of seat cushions and molded cushions, headrests, armrests and footrests for cars, bicycle saddles, steering wheel covers and shoe soles (including midsoles and insoles).

The process according to the invention is for example suitable for processing resilient, thermoplastic, foamed or solid polyurethane waste having an elongation at break [Eb] of 20% to 600% (measured according to DIN EN ISO 1798:2008).

The process according to the invention is for example suitable for processing waste of polyurethane materials, in the formulation of which at least 40 parts of polyether-based or polyester-based polyol having a hydroxyl number of 28 mg KOH/g to 100 mg KOH/g (measured according to DIN 53240) were used.

Semi-rigid means that these foams are substantially more rigid than flexible foams, but do not have the rigidity or dimensional stability of rigid foam. However, the crossover is fluid, and any desired intermediate levels can be set. For the avoidance of doubt, semi-rigid foams are open-celled and do not form any appreciable skin upon foaming (i.e., no solid marginal region). Semi-rigid polyurethane foams may e.g., have an open cellular structure with a compressive strength of at least 100 kPa (measured according to EN ISO 844:2009).

A typical application for semi-rigid PUR foams, which are characterized by good energy absorption capacity, are side impact protection elements in doors and also energy absorbers in bumpers; they are also used in the pipeline and offshore industry, the automotive industry, and in sound wave reduction in house construction.

The process according to the invention is for example suitable for processing waste of polyurethane materials, in the formulation of which at least 40 parts of polyether-based or polyester-based polyol having a hydroxyl number of 60 mg KOH/g to 450 mg KOH/g (measured according to DIN 532404) are used.

Rigid PUR/PIR foams are highly crosslinked and, for the avoidance of doubt, have a closed cellular structure with a relatively high compressive strength. The degree of closed cells is usually >90%. Because of their optimal insulating capacity, insulating materials composed of rigid polyurethane foam can be used in a wide variety of applications—both as an insulating material (e.g., for cooling equipment and refrigeration facilities, building insulation, etc.) and also as a construction material in combination with different cover layers.

For the avoidance of doubt, rigid polyurethane foams have a closed cellular structure with a compressive strength of at least 25 kPa (e.g., 1K canned foam), in some cases at least 100 kPa (measured according to EN ISO 844:2009).

The process according to the invention is for example suitable for processing waste of polyurethane materials, in the formulation of which at least 40 parts of polyether-based or polyester-based polyol having a hydroxyl number of 150 mg KOH/g to 600 mg KOH/g (measured according to DIN 53240) are used.

The polyurethane waste (a) is preferably used in a total amount of 30 wt % to 60 wt %, preferably 35 wt % to 45 wt %, relative to the total mass of the reactants (a), (b), (c) and (d) defined above as 100 wt %.

Typically, the compounds (b) from the group consisting of polyether polyols and polyester polyols as defined above are primary polyols (i.e. not polyols obtained by cleaving polyurethane), as are typically used to produce polyurethanes. In the process according to the invention, use is customarily made either of compounds (b) from the group consisting of polyether polyols as defined above or compounds (b) from the group consisting of polyester polyols as defined above, but preferably not polyether polyols and polyester polyols in one and the same reaction mixture.

Compounds (b) from the group of the polyether polyols preferably have an average molar mass in the range from 200 g/mol to 6000 g/mol, preferably 400 g/mol to 5000 g/mol. Compounds (b) from the group of the polyester polyols preferably have an average molar mass in the range from 350 g/mol to 6000 g/mol, preferably 400 g/mol to 5000 g/mol.

If compounds (b) from the group of the polyether polyols are used, one or more antioxidants are typically mixed therewith.

Particularly when using polyester polyols, it is preferred that no peroxides are used in the process according to the invention, and preferably no radical formers at all.

Compounds (b) from the group consisting of polyether polyols and polyester polyols as defined above are preferably used in a total amount of 20 wt % to 60 wt %, preferably 20 wt % to 55 wt %, relative to the total mass of the reactants (a), (b), (c) and (d) defined above as 100 wt %. The total amount of the compounds (b) to be used from the group consisting of polyether polyols and polyester polyols can be added in a plurality of steps; e.g., preferably, a first portion of the compounds (b) from the group consisting of polyether polyols and polyester polyols is initially charged together with compounds (c) from the group consisting of dicarboxylic anhydrides and dicarboxylic acids and water (d), and a further portion of the compounds (b) is added at a subsequent stage of the process, when the polyurethane waste (a) has already been predominantly decomposed. Surprisingly, it has been found that the formation of agglomerates in the polyol composition is prevented if the total amount of compounds (b) from the group consisting of polyether polyols and polyester polyols as defined above is added in portions in a plurality of steps over the course of the reaction.

If the total amount of compounds (b) to be used from the group consisting of polyether polyols and polyester polyols as defined above is added in a plurality of steps, i.e., in the form of a plurality of portions, it is possible to add the same compounds (b) from the group consisting of polyether polyols and polyester polyols as defined above in each step, or it is possible to add different compounds (b) from the group consisting of polyether polyols and polyester polyols as defined above in each step.

The compounds (c) from the group consisting of dicarboxylic anhydrides and dicarboxylic acids cause cleavage of the polyurethanes contained in the waste by acidolysis. The polyols originally used to produce the polyurethanes are released thereby; furthermore, polyureas, oligoureas and acylureas, and optionally compounds from the group of the amines, amides and imides and further isocyanate-reactive oligomers can be formed. Decomposition products of the polyurethane that do not correspond to the liquid polyols originally used to form the polyurethanes are typically present as dispersed particles in a liquid phase containing polyols.

Preferably, the compounds (c) from the group consisting of dicarboxylic anhydrides and dicarboxylic acids are selected from the group consisting of adipic acid and the anhydrides of maleic acid, phthalic acid, hexahydrophthalic acid and succinic acid.

In certain cases, the reaction mixture also contains, in addition to one or more compounds (c) from the group consisting of dicarboxylic anhydrides and dicarboxylic acids, one or more monocarboxylic acids, e.g., acrylic acid.

Compounds (c) from the group consisting of dicarboxylic anhydrides and dicarboxylic acids and optionally monocarboxylic acids are preferably used in a total amount of 5 wt % to 20 wt %, relative to the total mass of the reactants (a), (b), (c) and (d) defined above as 100 wt %. The total amount of the compounds (c) to be used from the group consisting of dicarboxylic anhydrides and dicarboxylic acids can be added in a plurality of steps; e.g., preferably, a first portion of the compounds (c) is initially charged together with compounds (b) defined above from the group consisting of polyether polyols and polyester polyols and water (d), and a further portion of the compounds (c) is added at a subsequent stage of the process, when the polyurethane waste (a) has already been predominantly decomposed. The addition of compounds (c) from the group consisting of dicarboxylic anhydrides and dicarboxylic acids at a subsequent stage of the process serves in particular for the deamination of the polyol composition to be produced. If the total amount of compounds (c) to be used from the group consisting of dicarboxylic anhydrides and dicarboxylic acids is added in a plurality of steps, i.e., in the form of a plurality of portions, it is possible to add the same compounds (c) from the group consisting of dicarboxylic anhydrides and dicarboxylic acids in each step, or it is possible to add different compounds (c) from the group consisting of dicarboxylic anhydrides and dicarboxylic acids as defined above in each step.

Customarily, in the process according to the invention, the above-defined constituents (b)-(d) of the reaction mixture are initially charged and heated to a temperature of 130° C. to 230° C., preferably 140° C. to 200° C. The polyurethane waste (a) is then metered in, thereby forming a reaction mixture. While the polyurethane waste is being metered in, the temperature is kept in the range from 130° C. to 230° C., preferably 140° C. to 210° C. In parallel with the metering-in of the polyurethane waste (a), further water (d) can be added in one or more portions, or continuously.

The reaction mixture is then preferably kept at a temperature in the range from 190° C. to 240° C., preferably 200° C. to 240° C., for several hours (1 to 5 hours, preferably 2 to 3.5 hours).

Thereafter, a further portion of one or more compounds (c) from the group consisting of dicarboxylic anhydrides and dicarboxylic acids can be added. This serves in particular for the deamination of the polyol composition; to this end, following the addition of the further portion of one or more compounds (c), the reaction mixture is kept at a temperature in the range from 170° C. to 240° C., preferably 180° C. to 230° C., for 0.5 to 3 hours, preferably 0.5 to 1.5 hours.

The reaction mixture can subsequently be cooled. A further portion of compounds (b) from the group consisting of polyether polyols and polyester polyols as defined above can be added.

Preference is given to configurations of the process in which a mixture comprising (b) one or more compounds from the group consisting of polyether polyols having an average molar mass of 200 g/mol to 8000 g/mol and a hydroxyl functionality of 2 to 4,
  and polyester polyols having an average molar mass of 250 g/mol to 8000 g/mol and a hydroxyl functionality of 2 to 4, (c) one or more compounds from the group consisting of dicarboxylic anhydrides and dicarboxylic acids, and optionally one or more monocarboxylic acids, (d) water is initially charged and heated to a temperature of 130° C. to 230° C., preferably 140° C. to 200° C., polyurethane waste (a) is metered into this mixture such that a reaction mixture is formed, wherein the temperature is kept in the range from 130° C. to 230° C., preferably 140° C. to 210° C., in parallel with the metering-in of the polyurethane waste (a), further water (d) is added in one or more portions, or continuously, the reaction mixture is kept at a temperature in the range from 150° C. to 240° C., preferably 200° C. to 230° C., for 1 to 5 hours, preferably 2 to 3.5 hours, a further portion of one or more compounds (c) from the group consisting of dicarboxylic anhydrides and dicarboxylic acids is added, following the addition of the further portion of one or more compounds (c), the reaction mixture is kept at a temperature in the range from 170° C. to 240° C., preferably 180° C. to 230° C., for 0.5 to 3 hours, preferably 0.5 to 1.5 hours, and thereafter, the reaction mixture is cooled.

In a preferred variant of the process according to the invention, (a) polyurethane waste is used in a total amount of 30 wt % to 60 wt %, and/or (b) compounds from the group consisting of polyether polyols and polyester polyols are used in a total amount of 20 wt % to 60 wt %, and/or (c) compounds from the group consisting of dicarboxylic anhydrides and dicarboxylic acids and optionally monocarboxylic acids are used in a total amount of 5 wt % to 20 wt %, and/or (d) water is used in an amount of 0.2 wt % to 10 wt %, preferably 1 wt % to 6 wt %, in some cases particularly preferably 2 wt % to 5 wt %, in each case relative to the total mass of the reactants (a), (b), (c), and (d) defined above as 100 wt %.

In a particularly preferred variant of the process according to the invention, (a) polyurethane waste is used in a total amount of 30 wt % to 60 wt %, and (b) compounds from the group consisting of polyether polyols and polyester polyols are used in a total amount of 20 wt % to 60 wt %, and (c) compounds from the group consisting of dicarboxylic anhydrides and dicarboxylic acids and optionally monocarboxylic acids are used in a total amount of 5 wt % to 20 wt %, and (d) water is used in an amount of 0.2 wt % to 10 wt %, preferably 1 wt % to 6 wt %, in some cases particularly preferably 2 wt % to 5 wt %, in each case based on the total mass of the reactants (a), (b), (c), and (d) defined above as 100 wt %.

All stated amounts for the reactants (a), (b), (c) and (d) relate in each case to the amounts of the reactants (a)-(d) defined above used in one reaction batch, regardless of whether the total amount of the reactants in question was entirely added in one step or spread over a plurality of steps (i.e., in the form of a plurality of portions) at different points in time over the course of the process.

In certain configurations of the process according to the invention, in addition to the constituents (a) to (d) defined above, (e) one or more compounds from the group consisting of diols having 2 to 8 carbon atoms and triols having 3 to 8 carbon atoms are added to the reaction mixture.

Compounds (e) are particularly used if it is intended to produce a polyol composition suitable for producing rigid polyurethane foams.

The compounds (e) from the group consisting of diols having 2 to 8 carbon atoms and triols having 3 to 8 carbon atoms cause cleavage of the polyurethanes contained in the waste by glycolysis.

Preferred compounds (e) from the group consisting of diols having 2 to 8 carbon atoms and triols having 3 to 8 carbon atoms are diols and triols from the group consisting of ethylene glycol, diethylene glycol, dipropylene glycol, 1,3-propaneglycol, 1,2-butanediol, 1,4-butaneglycol and glycerol.

In configurations of the process in which one or more compounds (e) from the group consisting of diols having 2 to 8 carbon atoms and triols having 3 to 8 carbon atoms are used, it is preferred that the compounds (e) from the group consisting of diols having 2 to 8 carbon atoms and triols having 3 to 8 carbon atoms are used in a total amount of 1 wt % to 30 wt %, relative to the total mass of the reactants (a), (b), (c), (d) and (e) defined above as 100 wt %.

The total amount of the compounds (e) to be used from the group consisting of diols having 2 to 8 carbon atoms and triols having 3 to 8 carbon atoms can be added in a plurality of steps; e.g., preferably, a first portion of the compounds (e) is added if the polyurethane waste (a) has been metered in at least to a third, preferably to a half, and has dissolved, and a further portion of one or more compounds (e) is added at a subsequent stage of the process. The addition of compounds (e) from the group consisting of diols having 2 to 8 carbon atoms and triols having 3 to 8 carbon atoms, preferably dipropylene glycol or diethylene glycol, at a subsequent stage of the process serves in particular to bond acid groups in order to lower the acid number of the polyol composition.

If the total amount of compounds (e) to be used from the group consisting of diols having 2 to 8 carbon atoms and triols having 3 to 8 carbon atoms is added in a plurality of steps, i.e., in the form of a plurality of portions, it is possible to add the same compounds (e) from the group consisting of diols having 2 to 8 carbon atoms and triols having 3 to 8 carbon atoms in each step, or it is possible to add different compounds (e) from the group consisting of diols having 2 to 8 carbon atoms and triols having 3 to 8 carbon atoms as defined above in each step.

Customarily, in the process according to the invention, the above-defined constituents (b)-(d) of the reaction mixture are initially charged and heated to a temperature of 130° C. to 230° C., preferably 140° C. to 200° C. The polyurethane waste (a) is then metered in, thereby forming a reaction mixture. While the polyurethane waste is being metered in, the temperature is kept in the range from 130° C. to 230° C., preferably 140° C. to 210° C. In parallel with the metering-in of the polyurethane waste (a), further water (d) can be added in one or more portions, or continuously.

If the polyurethane waste (a) has been metered in at least to a third, preferably to a half, and has dissolved, one or more compounds (e) from the group consisting of diols having 2 to 8 carbon atoms and triols having 3 to 8 carbon atoms are added. Alternatively, one or more compounds (e) from the group consisting of diols having 2 to 8 carbon atoms and triols having 3 to 8 carbon atoms is added if the polyurethane waste (a) has completely dissolved. The reaction mixture is then preferably kept at a temperature in the range from 150° C. to 240° C., preferably 200° C. to 230° C., for several hours (1 to 5 hours, preferably 2 to 3.5 hours). Thereafter, a further portion of one or more compounds (c) from the group consisting of dicarboxylic anhydrides and dicarboxylic acids can be added. Following the addition of the further portion of compounds (c), the reaction mixture can be cooled or can be kept at a temperature in the range from 150° C. to 240° C., preferably 200° C. to 230° C., for 0.25 to 1.5 hours, preferably 0.5 to 1 hour, and can be cooled thereafter. Upon cooling the reaction mixture, a further portion of compounds (b) from the group consisting of polyether polyols and polyester polyols as defined above can be added.

Preference is given here to configurations of the process in which a mixture comprising (b) one or more compounds from the group consisting of polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4, (c) one or more compounds from the group consisting of dicarboxylic anhydrides and dicarboxylic acids, and optionally one or more monocarboxylic acids, and (d) water is initially charged and heated to a temperature of 130° C. to 230° C., preferably 140° C. to 200° C., polyurethane waste (a) is metered into this mixture such that a reaction mixture is formed, wherein the temperature is kept in the range from 130° C. to 230° C., preferably 140° C. to 210° C., in parallel with the metering-in of the polyurethane waste (a), further water (d) is added in one or more portions, or continuously, one or more compounds (e) from the group consisting of diols having 2 to 8 carbon atoms and triols having 3 to 8 carbon atoms are added if the polyurethane waste (a) has been metered in at least to a third, preferably to a half, and has dissolved; or one or more compounds (e) from the group consisting of diols having 2 to 8 carbon atoms and triols having 3 to 8 carbon atoms are added if the polyurethane waste (a) has completely dissolved, the reaction mixture is kept at a temperature in the range from 150° C. to 240° C., preferably 200° C. to 230° C., for 1 to 5 hours, preferably 2 to 3.5 hours, a further portion of one or more compounds (c) from the group consisting of dicarboxylic anhydrides and dicarboxylic acids is added, following the addition of the further portion of one or more compounds (c), the reaction mixture is cooled or is kept at a temperature in the range from 150° C. to 240° C., preferably 200° C. to 230° C., for 0.25 to 1.5 hours, preferably 0.5 to 1 hour, and is cooled thereafter.

Alternatively, following the metering-in of the polyurethane waste (a) (optionally with parallel metering-in of further water (d), as described above), the reaction mixture can be kept at a temperature in the range from 150° C. to 240° C., preferably 200° C. to 230° C., for 1 to 5 hours, preferably 2 to 3.5 hours, and then a further portion of one or more compounds (c) from the group consisting of dicarboxylic anhydrides and dicarboxylic acids can be added. After the reaction mixture has been kept at a temperature in the range from 170° C. to 240° C., preferably 180° C. to 230° C., for 0.25 to 1.5 hours, preferably 0.5 to 1 hour, one or more compounds (e) from the group consisting of diols having 2 to 8 carbon atoms and triols having 3 to 8 carbon atoms are added. Following the addition of compounds (e), the reaction mixture can be kept at a temperature in the range from 170° C. to 240° C., preferably 180° C. to 230° C., for 0.25 to 1.5 hours, preferably 0.5 to 1 hour. The reaction mixture can be cooled thereafter. Upon cooling the reaction mixture, a further portion of compounds (b) from the group consisting of polyether polyols and polyester polyols as defined above can be added.

Preference is given here to configurations of the process in which a mixture comprising
(b) one or more compounds from the group consisting of polyether polyols having an average molar mass of 200 g/mol to 8000 g/mol and a hydroxyl functionality of 2 to 4,
and polyester polyols having an average molar mass of 250 g/mol to 8000 g/mol and a hydroxyl functionality of 2 to 4,
(c) one or more compounds from the group consisting of dicarboxylic anhydrides and dicarboxylic acids, and optionally one or more monocarboxylic acids, and
(d) water
is initially charged and heated to a temperature of 130° C. to 230° C., preferably 140° C. to 200° C.,
polyurethane waste (a) is metered into this mixture such that a reaction mixture is formed, wherein the temperature is kept in the range from 130° C. to 230° C., preferably 140° C. to 210° C.,
in parallel with the metering-in of the polyurethane waste (a), further water (d) is added in one or more portions, or continuously,
the reaction mixture is kept at a temperature in the range from 150° C. to 240° C., preferably 200° C. to 230° C., for 1 to 5 hours, preferably 2 to 3.5 hours,
a further portion of one or more compounds (c) from the group consisting of dicarboxylic anhydrides and dicarboxylic acids is added,
following the addition of the further portion of one or more compounds (c), the reaction mixture is kept at a temperature in the range from 170° C. to 240° C., preferably 180° C. to 230° C., for 0.25 to 1.5 hours, preferably 0.5 to 1 hour,
one or more compounds (e) from the group consisting of diols having 2 to 8 carbon atoms and triols having 3 to 8 carbon atoms are added,
following the addition of the one or more compounds (e), the reaction mixture is kept at a temperature in the range from 170° C. to 240° C., preferably 180° C. to 230° C., for 0.25 to 1.5 hours, preferably 0.5 to 1 hour,
and thereafter, the reaction mixture is cooled.

Alternatively, the total amount of the compounds (e) from the group consisting of diols having 2 to 8 carbon atoms and triols having 3 to 8 carbon atoms can be added in portions in a plurality of steps over the course of the reaction. A first portion of one or more compounds (e) from the group consisting of diols having 2 to 8 carbon atoms and triols having 3 to 8 carbon atoms is added if the polyurethane waste (a) has been metered in at least to a third, preferably to a half, and has dissolved; or if the polyurethane waste (a) has completely dissolved. The reaction mixture is then preferably kept at a temperature in the range from 150° C. to 240° C., preferably 200° C. to 230° C., for several hours (1 to 5 hours, preferably 2 to 3.5 hours). Thereafter, a further portion of one or more compounds (c) from the group consisting of dicarboxylic anhydrides and dicarboxylic acids can be added. Following the addition of the further portion of one or more compounds (c), the reaction mixture can be kept at a temperature in the range from 170° C. to 240° C., preferably 180° C. to 230° C., for 0.25 to 1.5 hours, preferably 0.5 to 1 hour. One or more compounds (e) from the group consisting of diols having 2 to 8 carbon atoms and triols having 3 to 8 carbon atoms are then added. This addition of a further portion of compounds (e) serves in particular to bond excess acid groups, in order to obtain a polyol composition having a low acid number. Following the addition of the further portion of compounds (e), the reaction mixture can be kept at a temperature in the range from 170° C. to 240° C., preferably 180° C. to 230° C., for 0.25 to 1.5 hours, preferably 0.5 to 1 hour. The reaction mixture can then be cooled. Upon cooling the reaction mixture, a further portion of compounds (b) from the group consisting of polyether polyols and polyester polyols as defined above can be added.

Preference is given here to configurations of the process in which a mixture comprising
(b) one or more compounds from the group consisting of polyether polyols having an average molar mass of 200 g/mol to 8000 g/mol and a hydroxyl functionality of 2 to 4,
and polyester polyols having an average molar mass of 250 g/mol to 8000 g/mol and a hydroxyl functionality of 2 to 4,
(c) one or more compounds from the group consisting of dicarboxylic anhydrides and dicarboxylic acids, and optionally one or more monocarboxylic acids, and
(d) water
is initially charged and heated to a temperature of 130° C. to 230° C., preferably 140° C. to 200° C.,
polyurethane waste (a) is metered into this mixture such that a reaction mixture is formed, wherein the temperature is kept in the range from 130° C. to 230° C., preferably 140° C. to 210° C.,
in parallel with the metering-in of the polyurethane waste (a), further water (d) is added in one or more portions, or continuously,
one or more compounds (e) from the group consisting of diols having 2 to 8 carbon atoms and triols having 3 to 8 carbon atoms are added if the polyurethane waste (a) has been metered in at least to a third, preferably to a half, and has dissolved; or one or more compounds (e) from the group consisting of diols having 2 to 8 carbon atoms and triols having 3 to 8 carbon atoms are added if the polyurethane waste (a) has completely dissolved,
the reaction mixture is kept at a temperature in the range from 150° C. to 240° C., preferably 200° C. to 230° C., for 1 to 5 hours, preferably 2 to 3.5 hours, a further portion of one or more compounds (c) from the group consisting of dicarboxylic anhydrides and dicarboxylic acids is added, following the addition of the further portion of one or more compounds (c), the reaction mixture is kept at a temperature in the range from 170° C. to 240° C., preferably 180° C. to 230° C., for 0.25 to 1.5 hours, preferably 0.5 to 1 hour, a further portion of one or more compounds (e) from the group consisting of diols having 2 to 8 carbon atoms and triols having 3 to 8 carbon atoms is added, following the addition of the further portion of one or more compounds (e), the reaction mixture is kept at a temperature in the range from 170° C. to 240° C., preferably 180° C. to 230° C., for 0.25 to 1.5 hours, preferably 0.5 to 1 hour, and thereafter, the reaction mixture is cooled.

In a preferred variant of the process configuration described above with the addition of one or more compounds (e) from the group consisting of diols having 2 to 8 carbon atoms and triols having 3 to 8 carbon atoms, (a) polyurethane waste is used in a total amount of 30 wt % to 60 wt %, and/or (b) compounds from the group consisting of polyether polyols and polyester polyols are used in a total amount of 20 wt % to 60 wt %, and/or (c) compounds from the group consisting of dicarboxylic anhydrides and dicarboxylic acids and optionally monocarboxylic acids are used in a total amount of 5 wt % to 20 wt %, and/or (d) water is used in an amount of 0.2 wt % to 10 wt %, preferably 1 wt % to 6 wt %, in some cases particularly preferably 2 wt % to 5 wt %, and/or (e) compounds from the group consisting of diols having 2 to 8 carbon atoms and triols having 3 to 8 carbon atoms are used in a total amount of 1 wt % to 30 wt %, in each case relative to the total mass of the reactants (a), (b), (c), (d) and (e) defined above as 100 wt %.

In a preferred variant of the process configuration described above with the addition of one or more compounds (e) from the group consisting of diols having 2 to 8 carbon atoms and triols having 3 to 8 carbon atoms, (a) polyurethane waste is used in a total amount of 30 wt % to 60 wt %, and (b) compounds from the group consisting of polyether polyols and polyester polyols are used in a total amount of 20 wt % to 60 wt %, and (c) compounds from the group consisting of dicarboxylic anhydrides and dicarboxylic acids and optionally monocarboxylic acids are used in a total amount of 5 wt % to 20 wt %, and (d) water is used in an amount of 0.2 wt % to 10 wt %, preferably 1 wt % to 6 wt %, in some cases particularly preferably 2 wt % to 5 wt %, and (e) compounds from the group consisting of diols having 2 to 8 carbon atoms and triols having 3 to 8 carbon atoms are used in a total amount of 1 wt % to 30 wt %, in each case relative to the total mass of the reactants (a), (b), (c), (d) and (e) defined above as 100 wt %.

All stated amounts for the reactants (a), (b), (c), (d) and (e) relate in each case to the amounts of the reactants (a)-(e) defined above used in one reaction batch, regardless of whether the total amount of the reactants in question was entirely added in one step or spread over a plurality of steps (i.e., in the form of a plurality of portions) at different points in time over the course of the process.

When designing a reaction apparatus for the process according to the invention, it should be taken into account that the process takes place at high temperatures in the presence of corrosive substances (acid anhydrides and/or acids). Therefore, it is preferred that the reaction is carried out in a container made from stainless steel. Particularly preferably, the entire reaction apparatus and peripherals are made of corrosion-resistant and acid-resistant stainless steel. In certain embodiments, the apparatus contains a fractionation or distillation device, e.g., in the form of a column, and suitable metering devices.

Because the reaction takes place less vigorously in the absence of radical formers, e.g., peroxides, cooling of the reactor is not absolutely necessary. This is a further advantage over the processes described in DE 195 12 778 C1 and WO 2018/091568 A1.

Another subject of the present invention is a polyol composition that can be produced according to a process according to the invention as described above, preferably according to a process having one or more of the above-described preferred features or according to one of the above-described preferred variants.

A polyol composition according to the invention comprises a liquid phase which contains the polyols released from the polyurethane waste and also one or more compounds (b) from the group consisting of polyether polyols and polyester polyols as defined above (as used as reactant).

A polyol composition according to the invention also contains reaction products formed during the acidolytic and—in configurations of the process where a compound (e) as defined above is added—glycolytic cleavage of the polyurethane waste, which reaction products are dispersed in the form of particles in the liquid phase, e.g., oligourethanes (shorter urethane chains remaining after partial decomposition of the original polyurethanes), oligoureas, polyureas and acylureas. Amines, amides and imides may also be present as further degradation products of the polyurethane waste.

If use is made of polyurethane waste that contains polyurethane associated with thermoplastics such as polyolefins, ABS or PVC, the polyol composition produced by the process according to the invention contains these thermoplasts in dispersed form; they can also be removed from the polyol composition if required by means of solid-liquid separation, e.g., by filtration.

A polyol composition according to the invention cannot contain unreacted residual polyurethane in the form of dispersed particles.

The unfiltered polyol composition according to the invention contains predominantly, or virtually exclusively, particles having a size in the range from 8 nanometers to 300 micrometers (average particle size in the range from 150 to 200 micrometers) and at most a small proportion of agglomerates having a size in the range from >300 micrometers to 5 millimeters (2 wt % or less relative to the weight of the unfiltered polyol composition). The particle size distribution is determined using a combination of dynamic light scattering (detects particle sizes from 1 nm to 1 μm), microscopy (detects particle sizes from 1 μm to 250 μm) and grindometry (detects particles sizes from 250 μm upward), in order to detect the total range of possible particle sizes.

Filtration makes it possible to remove the majority of agglomerates having a size in the range of >300 micrometers from the polyol composition.

The polyol composition which can be produced by the process according to the invention is isocyanate-reactive, i.e., the polyol released from the polyurethane waste and contained in the dispersion can be reacted with polyisocyanate to give a new polyurethane material.

A polyol composition according to the invention is characterized in that it has a lighter color and/or a smaller average particle size and/or a narrower particle size distribution than a polyol composition not in accordance with the invention which was produced from an identical starting material (polyurethane waste) under identical process conditions, with the sole exception that no water was added but rather a radical former, e.g., a peroxide, in particular hydrogen peroxide, was added.

In this context, "produced under identical process conditions" means in particular that, in order to produce the polyol composition according to the invention and the polyol composition not in accordance with the invention, use is made of identical starting material in the form of polyurethane waste (a), and also the same compounds (c) from the group consisting of dicarboxylic anhydrides and dicarboxylic acids and optionally monocarboxylic acids, and the same compounds (b) from the group consisting of polyether polyols and polyester polyols as defined above, in each case in identical amounts, and the reaction is carried out with identical temperature control, and also optionally the same compounds (e) from the group consisting of diols and triols as defined above, in each case in identical amounts, and that the reaction is carried out at identical temperature and for an identical duration. Moreover, it is obvious to those skilled in the art that, in order to be able to compare the production of the polyol composition according to the invention and the polyol composition not in accordance with the invention, all other parameters (e.g., process duration and order in which the reactants (a)-(e) are added) are identical, and an identical (structurally identical) apparatus is used.

Without wishing to be bound by a particular theory, it is assumed that the lighter color of the polyol composition according to the invention results in particular from the fact that in the process according to the invention fewer, or even no, radical formers, e.g., peroxides, are used which could enter into unwanted reactions with antioxidants contained in the polyurethane waste or in the compounds used from the group consisting of polyether polyols.

In this context, "lighter color" means that a color difference of at least 1 dE (ΔE), preferably of at least 2 dE (ΔE), particularly preferably of at least 5 dE (ΔE) (according to the Beer-Lambert law) can be measured between the polyol composition according to the invention and a polyol composition not in accordance with the invention that was produced from identical starting material (polyurethane waste) under identical process conditions, with the sole exception that no water was added but rather a radical former, e.g., a peroxide, in particular hydrogen peroxide, was added.

Without wishing to be bound by a particular theory, it is assumed that the smaller average particle size of the polyol composition according to the invention results from the fact that, in the process according to the invention, the formation of agglomerates having a size in the range from 1 to 10 millimeters is mostly prevented. An unfiltered polyol composition according to the invention contains predominantly, or virtually exclusively, particles having a size in the range from 8 nanometers to 300 micrometers (average particle size of 150 to 200 micrometers) and at most a small proportion of agglomerates having a size in the range from >300 micrometers to 5 millimeters (2 wt % or less relative to the weight of the unfiltered polyol composition). The particle size distribution is determined using a combination of dynamic light scattering (detects particle sizes from 1 nm to 1 µm), microscopy (detects particle sizes from 1 µm to 250 µm) and grindometry (detects particles sizes from 250 µm upward), in order to detect the total range of possible particle sizes.

Compared to a polyol composition according to the invention, a polyol composition not in accordance with the invention that was produced from identical starting material (polyurethane waste) under identical process conditions, with the sole exception that no water was added but rather a radical former, e.g., a peroxide, in particular hydrogen peroxide, was added, always has an at least 10%, often at least 20%, or even at least 50% greater proportion of agglomerates having a size in the range from 250 micrometers to 3 millimeters.

The predominant lack of agglomerates having a size of more than 250 micrometers leads, for a polyol composition according to the invention, to a narrower particle size distribution than a polyol composition not in accordance with the invention which was produced from identical starting material (polyurethane waste) under identical process conditions, with the sole exception that no water was added but rather a radical former, e.g., a peroxide, in particular hydrogen peroxide, was added.

A polyol composition according to the invention appears more regularly homogeneous and to be more finely dispersed than a polyol composition not in accordance with the invention which was produced from identical starting material (polyurethane waste) under identical process conditions, with the sole exception that no water was added but rather a radical former, e.g., a peroxide, in particular hydrogen peroxide, was added.

The polyols released from polyurethane waste and contained in a polyol composition according to the invention can have an average molar mass (Mn) in the range from 200 to 10 000 g/mol.

A polyol composition according to the invention generally has

- a hydroxyl number of 30 to 650 mg KOH/g (determined according to DIN 53240) and/or
- an amine number of 1 to 40 mg KOH/g (determined according to DIN 53176) and/or
- an acid number of 0.1 to 10 mg KOH/g (determined according to DIN 53402) and/or
- a viscosity of 1000 to 50 000 mPa*s (determined according to DIN 53019).

Preferably, a polyol composition according to the invention has

- a hydroxyl number of 30 to 400 mg KOH/g (determined according to DIN 53240) and
- an amine number of 1 to 20 mg KOH/g (determined according to DIN 53176) and
- an acid number of 0.1 to 5 mg KOH/g (determined according to DIN 53402) and
- a viscosity of 2000 to 12 000 mPa*s, particularly preferably 3000 to 8000 mPa*s (determined according to DIN 53019).

Polyol compositions according to the invention thus have a hydroxyl number that lies in the range of the polyols that are customarily used for producing polyurethanes. Thus, for example, polyol having a hydroxyl number in the range from 150 to 600 mg KOH/g is preferably used for producing rigid foams, polyol having a hydroxyl number in the range from 28 to 100 mg KOH/g is preferably used or producing flexible foams, and polyol having a hydroxyl number in the range from 35 to 160 mg KOH/g is preferably used for producing prepolymers, adhesives and/or elastomers. The hydroxyl numbers are determined in each case according to DIN 53240.

Preferably, the concentration of primary aromatic amines in the polyol composition according to the invention is less than 0.1% relative to the total mass of the polyol composition.

Another subject of the present invention is the use of a polyol composition obtainable by a process according to the invention for the production of polyurethanes. Corresponding processes for producing polyurethanes are known to those skilled in the art. As polyol component for the polyurethane formation, use is preferably made here of a mixture of the polyol and primary polyol (i.e., polyol not obtained by cleavage of polyurethane) obtained from polyurethane waste by the process according to the invention, preferably in a weight ratio of 10:90 to 60:40, and said polyol component is customarily reacted with a polyisocyanate component.

The following nonlimiting examples serve to further illustrate the invention.

The experiments of the examples were carried out under a protective gas atmosphere.

EXAMPLE 1

In a heatable stainless steel stirred reactor equipped with a fractionation column, under stirring, (b) 37 wt % of a long-chain polyether triol (Lupranol® 3300, BASF) having an average molar mass of 420 g/mol (c) 8 wt % of phthalic anhydride, and (d) 2 wt % of demineralized water were initially charged and heated to 150° C. within 90 minutes. At this temperature, under stirring, (a) 40 wt % of polyurethane waste (post-consumer mattresses, unsorted, shredded to approximately 2 cm×2 cm×2 cm in size)

were added, with the temperature being kept in the range from 150° C. to 210° C. until the polyurethane waste (a) had dissolved. During the addition of the polyurethane waste (a), (d) a further 2 wt % of demineralized water were added in steps. Thereafter, stirring was carried out for an hour, and subsequently (e) 7 wt % of short-chain glycol (diethylene glycol)

were added, with the temperature being kept in the range from 220° C. to 235° C. The mixture was then stirred for an hour at a temperature of 220° C. and subsequently, under stirring, (c) 2 wt % of maleic anhydride, and, after 10 minutes, under stirring, (e) 2 wt % of dipropylene glycol were added. The mixture was kept at 220° C. for a further 30 min and thereafter was cooled to 80° C., under stirring.

The polyol composition obtained was then pumped off, filtered using a self-cleaning filter (150 μm), and cooled to room temperature.

After filtration, the polyol composition has the following properties:

Hydroxyl number: 268 mg KOH/g determined according to DIN 53240

Acid number: 0.7 mg KOH/g determined according to DIN 53402

Viscosity: 5600 m Pa*s at 25° C. determined according to DIN 53019

Amine number: 18 mg KOH/g determined according to DIN 53176.

This polyol composition is suitable for producing rigid polyurethane foam. The low acid number prevents a negative influence on catalysis in the subsequent production of rigid polyurethane foam.

EXAMPLE 2

In a heatable stainless steel stirred reactor equipped with a fractionation column, under stirring, (b) 38 wt % of a polyether triol (Dow Chemical Company, VORANOL CP 450) having an average molar mass of 440 g/mol (c) 7 wt % of phthalic anhydride, and 2 wt % of succinic anhydride, and (d) 1.5 wt % of demineralized water were initially charged and heated to 165° C. within 100 minutes. At this temperature, under stirring, (a) 40 wt % of polyurethane waste (post-consumer mattresses, unsorted, shredded to approximately 2 cm×2 cm×2 cm in size)

were added, with the temperature being kept in the range from 165° C. to 200° C. until the polyurethane waste had dissolved. In parallel to the addition of the polyurethane waste (a), (d) a further 2.5 wt % of demineralized water were added in steps. After the polyurethane waste (a) was completely metered into the reactor, under stirring, (e) 9 wt % of diethylene glycol were added, with the temperature being kept in the range from 200° C. to 220° C. Alternatively, the diethylene glycol can be added when at least half, preferably at least two thirds of the polyurethane waste (a) has been metered into the reactor. The mixture was stirred in the range from 210° C. to 225° C. for 1.5 hours. Subsequently, under stirring, (c) 2 wt % of maleic anhydride were added, and immediately thereafter the mixture was cooled to 120° C., under stirring.

The polyol composition obtained was then pumped off, filtered using a self-cleaning filter (150 μm), and cooled to room temperature.

A polyol composition was obtained having an acid number of less than 1.5 mg KOH/g and a content of primary aromatic amines of less than 0.05 wt %. After filtration, the polyol composition has the following properties:

Hydroxyl number: 270 mg KOH/g determined according to DIN 53240

Acid number: 1.2 mg KOH/g determined according to DIN 53402

Viscosity: 4800 m Pa*s at 25° C. determined according to DIN 53019

Amine number: 14 mg KOH/g determined according to DIN 53176.

This polyol composition is suitable for producing rigid polyurethane foams (PUR and/or PUR/PIR). In experiments for producing PUR/PIR foam panels, use was made of polyol and primary polyol (i.e., polyol not obtained by cleavage of polyurethane) recovered from polyurethane waste by the process according to the invention, according to example 1 or 2, in a weight ratio of 10:90 to 50:50. PUR/PIR panels were obtained which had properties that were not adversely affected compared to the corresponding original PUR products (without addition of polyol recovered from polyurethane waste). In particular, the compressive strength, dimensional stability and thermal conductivity of the products were comparable or equivalent.

EXAMPLE 3

In a heatable stainless steel stirred reactor equipped with a fractionation column, under stirring, (b) 38 wt % of a long-chain polyether polyol (Arcola) Polyol 1108, Covestro) having a hydroxyl number of 48 mg KOH/g (c) 6 wt % of phthalic anhydride, and 4 wt % of acrylic acid (d) 1 wt % of demineralized water were initially charged and heated to 160° C. within 90 minutes. At this temperature, under stirring, (a) 41 wt % of flexible polyurethane foam waste (unsorted)

were added, with the temperature being kept in the range from 160° C. to 210° C. In parallel to the addition of the polyurethane waste, (d) a further 4 wt % of demineralized water were added in steps. Thereafter, stirring was carried out for an hour at 210° C. until the polyurethane waste had completely dissolved. Subsequently, the temperature was kept in the range from 220° C. to 225° C. for two hours, under stirring. The mixture was stirred for a further half hour at a temperature of 225° C. Then, under stirring, (c) 2 wt % of maleic anhydride and, after 10 minutes, under stirring, (e) 1 wt % of dipropylene glycol were added. The mixture was stirred at 220° C. for a further 30 min and thereafter was cooled to 130° C., under stirring, and (b) 3 wt. % of Arcola) Polyol 1108 were added.

The polyol composition obtained was filtered off at 100° C. by means of a 250 μm filter and cooled to room temperature.

After filtration, the polyol composition has the following properties:

Hydroxyl number: 53 mg KOH/g determined according to DIN 53240

Acid number: 0.7 mg KOH/g determined according to DIN 53402

Viscosity: 8700 m Pa*s at 25° C. determined according to DIN 53019

Amine number: 9 mg KOH/g determined according to DIN 53176.

This polyol composition is suitable for producing flexible polyurethane foams.

EXAMPLE 4

In a heatable stainless steel stirred reactor equipped with a fractionation column, under stirring, (b) 36 wt % of a polyester polyol (Lupraphen 5608/1, BASF) having an average molar mass of 2000 g/mol, (c) 7 wt % of phthalic anhydride, and 3 wt % of adipic acid (d) 2 wt % of demineralized water were initially charged and heated to 150° C. within 90 minutes. At this temperature, under stirring, (a) 41 wt. % of polyurethane waste (polyester-based shoe soles, unsorted)

were added, with the temperature being kept in the range from 150° C. to 210° C. In parallel to the addition of the polyurethane waste (a), a further (d) 1 wt % of demineralized water were added in steps. Thereafter, stirring was carried out for an hour at 210° C. until the polyurethane waste (a) had completely dissolved. Subsequently, the temperature was kept in the range from 220° C. to 225° C. for two hours, under stirring. The mixture was stirred for a further half hour at a temperature of 225° C. Then, under stirring, (c) 1.5 wt % of hexahydrophthalic anhydride and, after 10 minutes, under stirring, (e) 1.5 wt % of dipropylene glycol were added. The mixture was kept at 220° C. for a further 30 min, under stirring, and thereafter was cooled to 130° C., under stirring, and (b) 7 wt. % of polyester polyol were added.

The polyol composition obtained was filtered off at 100° C. by means of a 200 μm filter and cooled to room temperature.

After filtration, the polyol composition has the following properties:

Hydroxyl number: 54 mg KOH/g determined according to DIN 53240

Acid number: 1.5 mg KOH/g determined according to DIN 53402

Viscosity: 4700 m Pa*s at 25° C. determined according to DIN 53019

Amine number: 5 mg KOH/g determined according to DIN 53176.

This polyol composition is suitable for producing polyester-based polyurethane shoe soles.

EXAMPLE 5

In a heatable stainless steel stirred reactor equipped with a fractionation column, under stirring, (b) 32 wt % of a polyester polyol (STEPANPOL® PS-3152) having an average molar mass of 350 g/mol, (c) 7 wt % of phthalic anhydride and 2 wt % of maleic anhydride (d) 2 wt % of demineralized water were initially charged and heated to 150° C. within 90 minutes. At this temperature, under stirring, (a) 40 wt % of flexible polyurethane foam waste (unsorted)

were added, with the temperature being kept in the range from 150° C. to 210° C. In parallel to the addition of the polyurethane waste (a), (d) a further 1.5 wt % of demineralized water and, in steps, (e) 14 wt % of diethylene glycol were added, with the temperature being kept in the range from 180° C. to 210° C. Thereafter, stirring was carried out for an hour at 210° C. until the polyurethane waste had completely dissolved. Subsequently, the temperature was kept in the range from 220° C. to 235° C. for two hours, under stirring. The mixture was stirred for a further half hour at a temperature of 225° C. Then, under stirring, (c) 1.5 wt % of maleic anhydride were added and stirred at 220° C. for a further 30 min and thereafter cooling was carried out to 100° C., under stirring.

The polyol composition obtained was filtered off at 100° C. by means of a 150 μm filter and cooled to room temperature.

After filtration, the polyol composition has the following properties:

Hydroxyl number: 264 mg KOH/g determined according to DIN 53240

Acid number: 1.8 mg KOH/g determined according to DIN 53402

Viscosity: 7500 m Pa*s at 25° C. determined according to DIN 53019

Amine number: 16 mg KOH/g determined according to DIN 53176.

This polyol composition is suitable for producing rigid polyurethane foams (PUR and/or PUR/PIR).

EXAMPLE 6

In a heatable stainless steel stirred reactor equipped with a fractionation column, under stirring, (b) 38 wt % of a long-chain polyether polyol (VORANOL™ 8136, DOW Chemicals) having an average molar mass of 3100 g/mol and a hydroxyl number of 55 mg KOH/g (c) 7 wt % of phthalic anhydride, and 3 wt % of acrylic acid (d) 1 wt % of demineralized water were initially charged and heated to 160° C. within 90 minutes. At this temperature, under stirring, (a) 41 wt % of flexible polyurethane foam waste (unsorted)

were added, with the temperature being kept in the range from 160° C. to 210° C. In parallel to the addition of the polyurethane waste (a), (d) a further 3.5 wt % of demineralized water were added in steps. Thereafter, stirring was carried out for an hour at 210° C. until the polyurethane waste (a) had completely dissolved. Subsequently, the temperature was kept in the range from 220° C. to 225° C. for two hours, under stirring. The mixture was stirred for a further half hour at a temperature of 225° C. Then, under stirring, (c) 1.75 wt % of maleic anhydride and, after 10 minutes, under stirring, (e) 1.75 wt % of dipropylene glycol were added and the mixture was stirred at 220° C. for a further 30 min and thereafter cooled to 130° C., under stirring, and (b) 3 wt. % of VORANOL™ 8136, DOW Chemicals were added.

The polyol composition obtained was filtered off at 100° C. by means of a 250 μm filter and cooled to room temperature.

After filtration, the polyol composition has the following properties:

Hydroxyl number: 53 mg KOH/g determined according to DIN 53240

Acid number: 0.7 mg KOH/g determined according to DIN 53402

Viscosity: 8700 m Pa*s at 25° C. determined according to DIN 53019

Amine number: 9 mg KOH/g determined according to DIN 53176.

This polyol composition is suitable for producing flexible polyurethane foams.

EXAMPLE 7

In a heatable stainless steel stirred reactor equipped with a fractionation column, (b) 33 wt % of a long-chain polyether polyol (VORANOL™ 3322, DOW Chemicals) having a hydroxyl number of 48 mg KOH/g and an average molar mass of 3400 g/mol, together with (c) 9.5 wt % of phthalic anhydride, and 1 wt % of acrylic acid, and (d) 1.8 wt % of demineralized water were initially charged and heated to 160° C. within 90 minutes. At this temperature, (a) 42 wt % of flexible polyurethane foam waste (unsorted)

were added, with the temperature being kept in the range from 160° C. to 210° C. In parallel to the addition of the polyurethane waste (a), (d) a further 1.5 wt % of demineralized water were added in steps. Thereafter, stirring was continued for an hour at 210° C. until the polyurethane materials had completely dissolved. Subsequently, the temperature was kept in the range from 220° C. to 225° C. for two hours, under stirring. The mixture was stirred for a further half hour at a temperature of 225° C. Then, (c) 1 wt % of maleic anhydride were added. The mixture was stirred at 220° C. for a further 30 min and thereafter was cooled to 130° C., under stirring, and (b) 10.2 wt. % of VORANOL™ 3322 were added.

The polyol composition obtained was filtered off at 100° C. by means of a 250 μm filter and cooled to room temperature.

After filtration, the polyol composition has the following properties:

Hydroxyl number: 54 mg KOH/g determined according to DIN 53240

Acid number: 1.8 mg KOH/g determined according to DIN 53402

Viscosity: 8900 m Pa*s at 25° C. determined according to DIN 53019

Amine number: 10 mg KOH/g determined according to DIN 53176.

This polyol composition is suitable for producing flexible polyurethane foams.

The invention claimed is:

1. A process for producing a polyol composition containing polyols released from polyurethane waste, wherein, in a reaction mixture:

(a) polyurethane waste is reacted with;

(b) one or more reactant polyol compounds selected from the group consisting of;

polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4, (c) one or more compounds selected from the group consisting of dicarboxylic anhydrides and dicarboxylic acids; and (d) water, forming a polyol composition containing polyols released from the polyurethane waste and (b) the one or more reactant polyol compounds; and wherein peroxides are used in the reaction mixture in an amount of less than 0.05 wt % relative to the total mass of the reactants (a), (b), (c), (d) as 100 wt %.

2. The process as claimed in claim 1, wherein:

the one or more reactant polyol compounds (b) from the group of the polyether polyols have an average molar mass in the range from 200 g/mol to 6000 g/mol; and the one or more reactant polyol compounds (b) from the group of the polyester polyols have an average molar mass in the range from 350 g/mol to 6000 g/mol.

3. The process as claimed in claim 1, wherein at least one of:

the compounds (c) from the group consisting of dicarboxylic anhydrides and dicarboxylic acids are selected from the group consisting of adipic acid and the anhydrides of maleic acid, phthalic acid, hexahydrophthalic acid and succinic acid;

and the reaction mixture includes one or more monocarboxylic acids.

4. The process as claimed in claim 1, wherein a mixture comprising:

(b) the one or more one or more reactant polyol compounds selected from the group consisting of;

polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4;

(c) the one or more compounds selected from the group consisting of dicarboxylic anhydrides and dicarboxylic acids, and optionally one or more monocarboxylic acids; and (d) the water is initially charged and heated to a temperature of 130° C. to 230° C.;

the polyurethane waste (a) is metered into this mixture such that the reaction mixture is formed, wherein the temperature is kept in the range from 130° C. to 230° C.;

in parallel with the metering-in of the polyurethane waste (a), further water (d) is added in one or more portions, or continuously;

the reaction mixture is kept at a temperature in the range from 150° C. to 240° C. for 1 to 5 hours;

a further portion of the one or more compounds (c) from the group consisting of dicarboxylic anhydrides and dicarboxylic acids is added;

following the addition of the further portion of the one or more compounds (c), the reaction mixture is kept at a temperature in the range from 170° C. to 240° C. for 0.5 to 3 hours;

and thereafter, the reaction mixture is cooled.

5. The process as claimed in claim 1, wherein:

(e) one or more compounds selected from the group consisting of diols having 2 to 8 carbon atoms and triols having 3 to 8 carbon atoms are added to the reaction mixture; and wherein peroxides are used in the reaction mixture in an amount of less than 0.05 wt % relative to the total mass of the reactants (a), (b), (c), (d), (e) as 100 wt %.

6. The process as claimed in claim 5, wherein the compounds (e) from the group consisting of diols having 2 to 8 carbon atoms and triols having 3 to 8 carbon atoms are selected from the group consisting of ethylene glycol, diethylene glycol, dipropylene glycol, 1,3-propaneglycol, 1,2-butanediol, 1,4-butaneglycol and glycerol.

7. The process as claimed in claim 5, wherein a mixture comprising:

(b) the one or more reactant polyol compounds selected from the group consisting of;

polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4;

(c) the one or more compounds selected from the group consisting of dicarboxylic anhydrides and dicarboxylic acids, and optionally one or more monocarboxylic acids; and (d) the water is initially charged and heated to a temperature of 130° C. to 230° C.;

the polyurethane waste (a) is metered into this mixture such that the reaction mixture is formed, wherein the temperature is kept in the range from 130° C. to 230° C.;

in parallel with the metering-in of the polyurethane waste (a), further water (d) is added in one or more portions, or continuously;

one or more compounds (e) selected from the group consisting of diols having 2 to 8 carbon atoms and triols having 3 to 8 carbon atoms are added if the polyurethane waste (a) has been metered in at least to a third, preferably to a half, and has dissolved; or one or more compounds (e) from the group consisting of diols having 2 to 8 carbon atoms and triols having 3 to 8 carbon atoms are added if the polyurethane waste (a) has completely dissolved;

the reaction mixture is kept at a temperature in the range from 150° C. to 240° C. for 1 to 5 hours;

a further portion of the one or more compounds (c) selected from the group consisting of dicarboxylic anhydrides and dicarboxylic acids is added; and following the addition of the further portion of the one or more compounds (c), the reaction mixture is cooled or is kept at a temperature in the range from 150° C. to 240° C., for 0.25 to 1.5 hours; and is cooled thereafter.

8. The process as claimed in claim 5, wherein a mixture comprising (b) the one or more reactant polyol compounds selected from the group consisting of;

polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4, (c) the one or more compounds selected from the group consisting of dicarboxylic anhydrides and dicarboxylic acids, and optionally one or more monocarboxylic acids; and (d) the water is initially charged and heated to a temperature of 130° C. to 230° C.;

the polyurethane waste (a) is metered into this mixture such that the reaction mixture is formed, wherein the temperature is kept in the range from 130° C. to 230° C.;

in parallel with the metering-in of the polyurethane waste (a), further water (d) is added in one or more portions, or continuously;

the reaction mixture is kept at a temperature in the range from 150° C. to 240° C. for 1 to 5 hours;

a further portion of the one or more compounds (c) from the group consisting of dicarboxylic anhydrides and dicarboxylic acids is added;

following the addition of the further portion of the one or more compounds (c), the reaction mixture is kept at a temperature in the range from 170° C. to 240° C. for 0.25 to 1.5 hours;

one or more compounds (e) selected from the group consisting of diols having 2 to 8 carbon atoms and triols having 3 to 8 carbon atoms are added;

following the addition of the one or more compounds (e), the reaction mixture is kept at a temperature in the range from 170° C. to 240° C. for 0.25 to 1.5 hours;

and thereafter, the reaction mixture is cooled.

9. The process as claimed in claim 5, wherein a mixture comprising:

(b) the one or more reactant polyol compounds selected from the group consisting of;

polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4;

(c) the one or more compounds selected from the group consisting of dicarboxylic anhydrides and dicarboxylic acids, and optionally one or more monocarboxylic acids; and (d) the water is initially charged and heated to a temperature of 130° C. to 230° C.;

the polyurethane waste (a) is metered into this mixture such that the reaction mixture is formed, wherein the temperature is kept in the range from 130° C. to 230° C.;

in parallel with the metering-in of the polyurethane waste (a), further water (d) is added in one or more portions, or continuously;

one or more compounds (e) selected from the group consisting of diols having 2 to 8 carbon atoms and triols having 3 to 8 carbon atoms are added if the polyurethane waste (a) has been metered in at least to a third and has dissolved; or the one or more compounds (e) selected from the group consisting of diols having 2 to 8 carbon atoms and triols having 3 to 8 carbon atoms are added if the polyurethane waste (a) has completely dissolved;

the reaction mixture is kept at a temperature in the range from 150° C. to 240° C. for 1 to 5 hours;

a further portion of the one or more compounds (c) selected from the group consisting of dicarboxylic anhydrides and dicarboxylic acids is added;

following the addition of the further portion of the one or more compounds (c), the reaction mixture is kept at a temperature in the range from 170° C. to 240° C. for 0.25 to 1.5 hours;

a further portion of the one or more compounds (e) selected from the group consisting of diols having 2 to 8 carbon atoms and triols having 3 to 8 carbon atoms is added;

following the addition of the further portion of one or more compounds (e), the reaction mixture is kept at a temperature in the range from 170° C. to 240° C. for 0.25 to 1.5 hours;

and thereafter, the reaction mixture is cooled.

10. The process as claimed in claim 4, wherein, upon cooling the reaction mixture, adding a further portion of (b) the reactant polyol compounds selected from the group consisting of;

polyether polyols having an average molar mass of 200 to 8000 g/mol and a hydroxyl functionality of 2 to 4;

and polyester polyols having an average molar mass of 250 to 8000 g/mol and a hydroxyl functionality of 2 to 4.

11. The process as claimed in claim 1, wherein at least one of:

(a) the polyurethane waste is added in a total amount of 30 wt % to 60 wt %;

(b) the reactant polyol compounds selected from the group consisting of polyether polyols and polyester polyols are added in a total amount of 20 wt % to 60 wt %;

(c) the compounds selected from the group consisting of dicarboxylic anhydrides and dicarboxylic acids and monocarboxylic acids are added in a total amount of 5 wt % to 20 wt %;

(d) the water is added in an amount of 0.2 wt % to 10 wt %; and (e) optional compounds selected from the group consisting of diols having 2 to 8 carbon atoms and triols having 3 to 8 carbon atoms are added in a total amount of 1 wt % to 30 wt %;

in each case relative to the total mass of the reactants (a), (b), (c), (d) and (e) as 100 wt %.

12. The process as claimed in claim 1, wherein at least one of:

no radical formers are added; and one or more antioxidants are added to the reactant polyol compounds (b) from the group of the polyether polyols.

13. A method of making polyurethanes using the polyol composition produced according to claim 1.

14. The process as claimed in claim 2, wherein at least one of:

the compounds (c) from the group consisting of dicarboxylic anhydrides and dicarboxylic acids are selected from the group consisting of adipic acid and the anhydrides of maleic acid, phthalic acid, hexahydrophthalic acid and succinic acid;

and the reaction mixture also contains, in addition to the one or more compounds (c) from the group consisting of dicarboxylic anhydrides and dicarboxylic acids, one or more monocarboxylic acids.

15. The process as claimed in claim 6, wherein a mixture comprising:

(b) the one or more reactant polyol compounds selected from the group consisting of;

polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4;

(c) the one or more compounds selected from the group consisting of dicarboxylic anhydrides and dicarboxylic acids, and optionally one or more monocarboxylic acids; and (d) the water is initially charged and heated to a temperature of 130° C. to 230° C.;

the polyurethane waste (a) is metered into this mixture such that the reaction mixture is formed, wherein the temperature is kept in the range from 130° C. to 230° C.;

in parallel with the metering-in of the polyurethane waste (a), further water (d) is added in one or more portions, or continuously;

one or more compounds (e) selected from the group consisting of diols having 2 to 8 carbon atoms and triols having 3 to 8 carbon atoms are added if the polyurethane waste (a) has been metered in at least to a third and has dissolved; or one or more compounds (e) from the group consisting of diols having 2 to 8 carbon atoms and triols having 3 to 8 carbon atoms are added if the polyurethane waste (a) has completely dissolved;

the reaction mixture is kept at a temperature in the range from 150° C. to 240° cfor 1 to 5 hours;

a further portion of the one or more compounds (c) selected from the group consisting of dicarboxylic anhydrides and dicarboxylic acids is added; and following the addition of the further portion of the one or more compounds (c), the reaction mixture is cooled or is kept at a temperature in the range from 150° C. to 240° C. for 0.25 to 1.5 hours, and is cooled thereafter.

16. The process as claimed in claim 6, wherein a mixture comprising (b) the one or more reactant polyol compounds selected from the group consisting of;

polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4, (c) the one or more compounds from the group consisting of dicarboxylic anhydrides and dicarboxylic acids, and optionally one or more monocarboxylic acids; and (d) the water is initially charged and heated to a temperature of 130° C. to 230° C.;

the polyurethane waste (a) is metered into this mixture such that the reaction mixture is formed, wherein the temperature is kept in the range from 130° C. to 230° C.;

in parallel with the metering-in of the polyurethane waste (a), further water (d) is added in one or more portions, or continuously;

the reaction mixture is kept at a temperature in the range from 150° C. to 240° C. for 1 to 5 hours;

a further portion of the one or more compounds (c) from the group consisting of dicarboxylic anhydrides and dicarboxylic acids is added;

following the addition of the further portion of the one or more compounds (c), the reaction mixture is kept at a temperature in the range from 170° C. to 240° C. for 0.25 to 1.5 hours;

one or more compounds (e) selected from the group consisting of diols having 2 to 8 carbon atoms and triols having 3 to 8 carbon atoms are added;

following the addition of the one or more compounds (e), the reaction mixture is kept at a temperature in the range from 170° C. to 240° C. for 0.25 to 1.5 hours;

and thereafter, the reaction mixture is cooled.

17. The process as claimed in claim 6, wherein a mixture comprising:

(b) the one or more reactant polyol compounds selected from the group consisting of;

polyether polyols having an average molar mass of 200 g/mol to 8000 g/mol and a hydroxyl functionality of 2 to 4, and polyester polyols having an average molar mass of 250 g/mol to 8000 g/mol and a hydroxyl functionality of 2 to 4;

(c) the one or more compounds selected from the group consisting of dicarboxylic anhydrides and dicarboxylic acids, and optionally one or more monocarboxylic acids; and (d) the water is initially charged and heated to a temperature of 130° C. to 230° C.;

the polyurethane waste (a) is metered into this mixture such that the reaction mixture is formed, wherein the temperature is kept in the range from 130° C. to 230° C.;

in parallel with the metering-in of the polyurethane waste (a), further water (d) is added in one or more portions, or continuously;

one or more compounds (e) selected from the group consisting of diols having 2 to 8 carbon atoms and triols having 3 to 8 carbon atoms are added if the polyurethane waste (a) has been metered in at least to a third and has dissolved; or one or more compounds (e) selected from the group consisting of diols having 2 to 8 carbon atoms and triols having 3 to 8 carbon atoms are added if the polyurethane waste (a) has completely dissolved;

the reaction mixture is kept at a temperature in the range from 150° C. to 240° C. for 1 to 5 hours;

a further portion of the one or more compounds (c) selected from the group consisting of dicarboxylic anhydrides and dicarboxylic acids is added;

following the addition of the further portion of the one or more compounds (c), the reaction mixture is kept at a temperature in the range from 170° C. to 240° C. for 0.25 to 1.5 hours;

a further portion of the one or more compounds (e) selected from the group consisting of diols having 2 to 8 carbon atoms and triols having 3 to 8 carbon atoms is added;

following the addition of the further portion of the one or more compounds (e), the reaction mixture is kept at a temperature in the range from 170° C. to 240° C. for 0.25 to 1.5 hours;

and thereafter, the reaction mixture is cooled.

18. The process as claimed in claim 1, wherein peroxides are used in the reaction mixture in an amount of less than 0.01 wt % relative to the total mass of the reactants (a), (b), (c), (d) as 100 wt %.

19. The process as claimed in claim 1, wherein no peroxides are used in the reaction mixture.

* * * * *